(12) United States Patent
Mori et al.

(10) Patent No.: US 11,501,124 B2
(45) Date of Patent: Nov. 15, 2022

(54) MEASURING DEVICE, IMAGE READING APPARATUS AND IMAGE FORMING SYSTEM FOR CONTROLLING MOVEMENT OF A SHEET

(71) Applicant: CANON KABUSHIKI KAISHA, Tokyo (JP)

(72) Inventors: Eikou Mori, Tokyo (JP); Naoto Tokuma, Chiba (JP); Akito Sekigawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/320,458

(22) Filed: May 14, 2021

(65) Prior Publication Data

US 2021/0365752 A1 Nov. 25, 2021

(30) Foreign Application Priority Data

May 19, 2020 (JP) .............................. JP2020-087091

(51) Int. Cl.
*G06K 15/16* (2006.01)
*G03G 15/00* (2006.01)
*G06K 15/02* (2006.01)
*G06K 15/00* (2006.01)

(52) U.S. Cl.
CPC ......... *G06K 15/16* (2013.01); *G03G 15/6555* (2013.01); *G06K 15/027* (2013.01); *G06K 15/1822* (2013.01); *G06K 15/403* (2013.01); *G06K 15/4065* (2013.01); *G03G 2215/00945* (2013.01); *G03G 2215/00949* (2013.01)

(58) Field of Classification Search
CPC .. G06K 15/16; G06K 15/1822; G06K 15/403; G06K 15/4065; G03G 15/6555
See application file for complete search history.

(56) References Cited

U.S. PATENT DOCUMENTS

| | | | |
|---|---|---|---|
| 8,087,667 B2 | 1/2012 | Sekigawa |
| 8,240,664 B2 | 8/2012 | Sekigawa |
| 8,500,122 B2 | 8/2013 | Kushida et al. |
| 8,550,461 B2 | 10/2013 | Sekigawa et al. |
| 8,613,442 B2 | 12/2013 | Gamo et al. |
| 8,752,837 B2 | 6/2014 | Iwata et al. |
| 8,794,617 B2 | 8/2014 | Tokuma |
| 8,851,468 B2 | 10/2014 | Tokuma |
| 9,033,330 B2 | 5/2015 | Tokuma |

(Continued)

FOREIGN PATENT DOCUMENTS

| | | |
|---|---|---|
| JP | 2009-053346 A | 3/2009 |
| JP | 2013-054324 A | 3/2013 |
| JP | 2014-131205 A | 7/2014 |

*Primary Examiner* — Nicholas Pachol
(74) *Attorney, Agent, or Firm* — Venable LLP

(57) ABSTRACT

A measuring device includes a first roller pair, a colorimetric unit, a second roller pair, a third roller pair, a motor, and a torque limiter. The third roller pair is driven at a first speed before a trailing end of the sheet with respect to a sheet feeding direction passes through the first roller pair and is driven at a second speed higher than the first speed after the trailing end of the sheet passes through the first roller pair. The first speed is set so as to be equal to the peripheral speed of the first roller pair. The second speed is set so as to be equal to a peripheral speed of the second roller pair in a state in which a slip of the torque limiter is not caused.

18 Claims, 12 Drawing Sheets

(56) References Cited

U.S. PATENT DOCUMENTS

| | | | |
|---|---|---|---|
| 9,067,753 B2 | 6/2015 | Tokuma et al. | |
| 9,102,497 B2 | 8/2015 | Tokuma | |
| 9,213,293 B2 | 12/2015 | Tajima et al. | |
| 9,551,966 B2 | 1/2017 | Hirota et al. | |
| 9,665,055 B2 | 5/2017 | Sekigawa | |
| 9,738,469 B2 | 8/2017 | Sekigawa | |
| 9,890,011 B2 | 2/2018 | Tokuma | |
| 9,914,611 B2 | 3/2018 | Tokuma | |
| 9,932,194 B2 | 4/2018 | Tokuma | |
| 9,932,195 B2 | 4/2018 | Sekigawa | |
| 9,971,270 B2 | 5/2018 | Hirota et al. | |
| 10,183,829 B2 | 1/2019 | Tokuma | |
| 10,294,059 B2 | 5/2019 | Tokuma | |
| 10,317,836 B2 | 6/2019 | Tokuma | |
| 10,782,639 B2 | 9/2020 | Tokuma et al. | |
| 10,981,738 B2 | 4/2021 | Sekigawa | |
| 2012/0275839 A1 | 11/2012 | Kushida et al. | |
| 2012/0288310 A1 | 11/2012 | Kamiya et al. | |
| 2013/0243451 A1 | 9/2013 | Hirota et al. | |
| 2014/0030000 A1 | 1/2014 | Gamo et al. | |
| 2014/0185047 A1 | 7/2014 | Tajima et al. | |
| 2016/0366296 A1* | 12/2016 | Isokawa | G03G 15/5029 |
| 2017/0102631 A1 | 4/2017 | Hirota et al. | |
| 2019/0127167 A1 | 5/2019 | Mori | |
| 2020/0041946 A1 | 2/2020 | Sekigawa | |
| 2020/0089152 A1* | 3/2020 | Kume | G03G 15/5041 |
| 2020/0247627 A1 | 8/2020 | Sekigawa et al. | |
| 2020/0387099 A1 | 12/2020 | Tokuma et al. | |
| 2021/0087004 A1 | 3/2021 | Koga et al. | |
| 2021/0360116 A1* | 11/2021 | Nagata | H04N 1/00602 |

* cited by examiner

MEASURING DEVICE, IMAGE READING APPARATUS AND IMAGE FORMING SYSTEM FOR CONTROLLING MOVEMENT OF A SHEET

FIELD OF THE INVENTION AND RELATED ART

The present invention relates to a measuring device for measuring an image on a sheet, an image reading apparatus for reading image on information from the sheet, and an image forming system for forming the image on the sheet.

As a main criterion for evaluation, it is possible to cite a high image quality representing by an index such as graininess, in-plane uniformity, character quality, color reproducibility (including color stability), geometrical characteristic (front/rear registration), or the like. Japanese Laid-Open Patent Application (JP-A) 2009-53346 and 2013-54324 disclose that in an image forming system of an electrophotographic type, a color of an image on a sheet is measured by using a color sensor provided on a feeding passage along which the sheet on which the image is formed. By using such a color sensor of an in-line type, it becomes possible to automatically execute, as a series of operations, formation of the image, which is an object to be measured such as a color chart, on the sheet and setting of an image forming condition.

In order to measure the image on the sheet by the color sensor of the in-line type with high accuracy, it is important that a distance from the color sensor to the sheet is stable. JP-A 2014-131205 discloses a constitution in which in the case where measurement of a color is carried out by the color sensor, a passing position of the sheet is aligned with a focus position of the color sensor by pressing the sheet toward the color sensor side by a pressing roller opposing the color sensor.

Incidentally, in the constitution in JP-A 2014-131205, there is a need to provide the pressing roller and a mechanism for moving the pressing roller, thus leading to an increase in cost and upsizing of a device.

SUMMARY OF THE INVENTION

A principal object of the present invention is to provide a measuring device, an image reading apparatus and an image forming system which are capable of improving measurement accuracy with a simple constitution.

According to an aspect of the present invention, there is provided a measuring device comprising: a first roller pair configured to feed a sheet; a colorimetric unit provided downstream of the first roller pair with respect to a sheet feeding direction and configured to measure a color of an image on the sheet; a second roller pair provided downstream of the colorimetric unit with respect to the sheet feeding direction and configured to be rotated at a peripheral speed higher than a peripheral speed of the first roller pair; a third roller pair provided downstream of the second roller pair with respect to the sheet feeding direction and configured to feed the sheet; a motor configured to drive the first roller pair and the second roller pair; and a torque limiter configured to permit rotation of the first roller pair at a peripheral speed equal to the peripheral speed of the first roller pair in a state in which the sheet is nipped in both the first roller pair and the second roller pair, wherein the third roller pair is driven at a first speed before a trailing end of the sheet with respect to the sheet feeding direction passes through the first roller pair and is driven at a second speed higher than the first speed after the trailing end of the sheet passes through the first roller pair, wherein the first speed is set so as to be equal to the peripheral speed of the first roller pair; and wherein the second speed is set so as to be equal to a peripheral speed of the second roller pair in a state in which a slip of the torque limiter is not caused.

According to another aspect of the present invention, there is provided an image reading apparatus comprising: a first roller pair configured to feed a sheet; a reading unit provided downstream of the first roller pair with respect to a sheet feeding direction and configured to read image information of the sheet; a second roller pair provided downstream of the reading unit with respect to the sheet feeding direction and configured to be rotated at a peripheral speed higher than a peripheral speed of the first roller pair; a motor configured to drive the first roller pair and the second roller pair; and a torque limiter configured to permit rotation of the first roller pair at a peripheral speed equal to the peripheral speed of the first roller pair in a state in which the sheet is nipped in both the first roller pair and the second roller pair.

Further features of the present invention will become apparent from the following description of exemplary embodiments with reference to the attached drawings.

Figure 8:
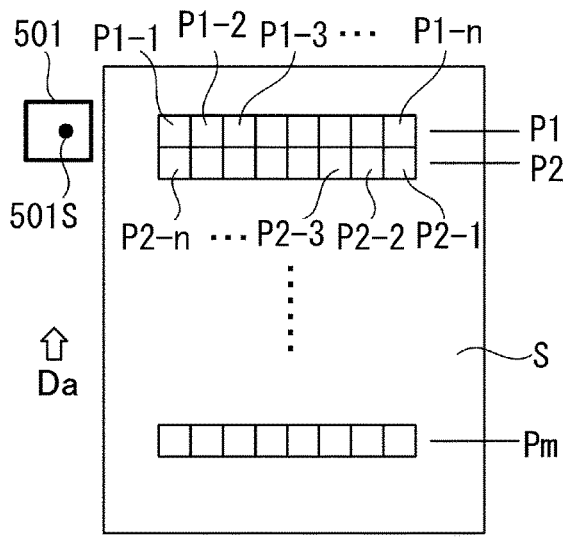
Figure 8:
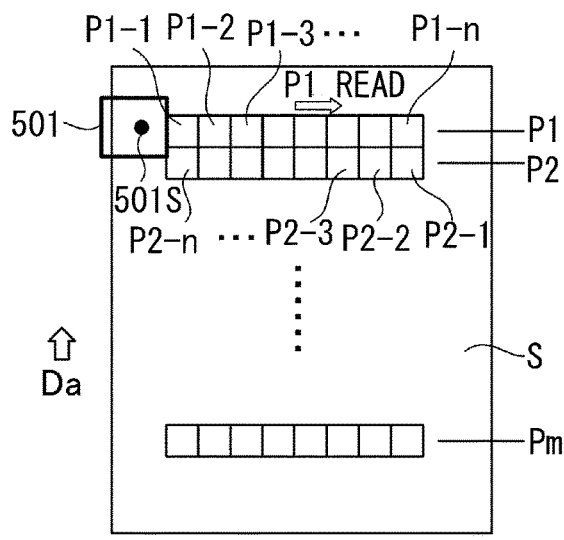
Figure 8:
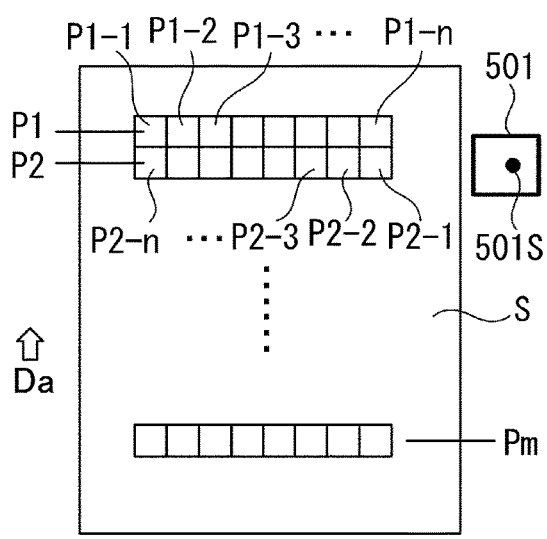
Figure 8:
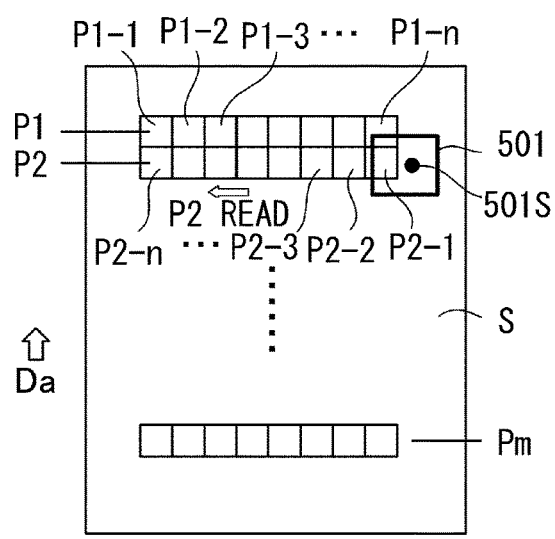

Parts (a) to (d) of FIG. 8 are schematic views for illustrating a color measuring operation of the measuring unit in the embodiment 1.

Figure 9:
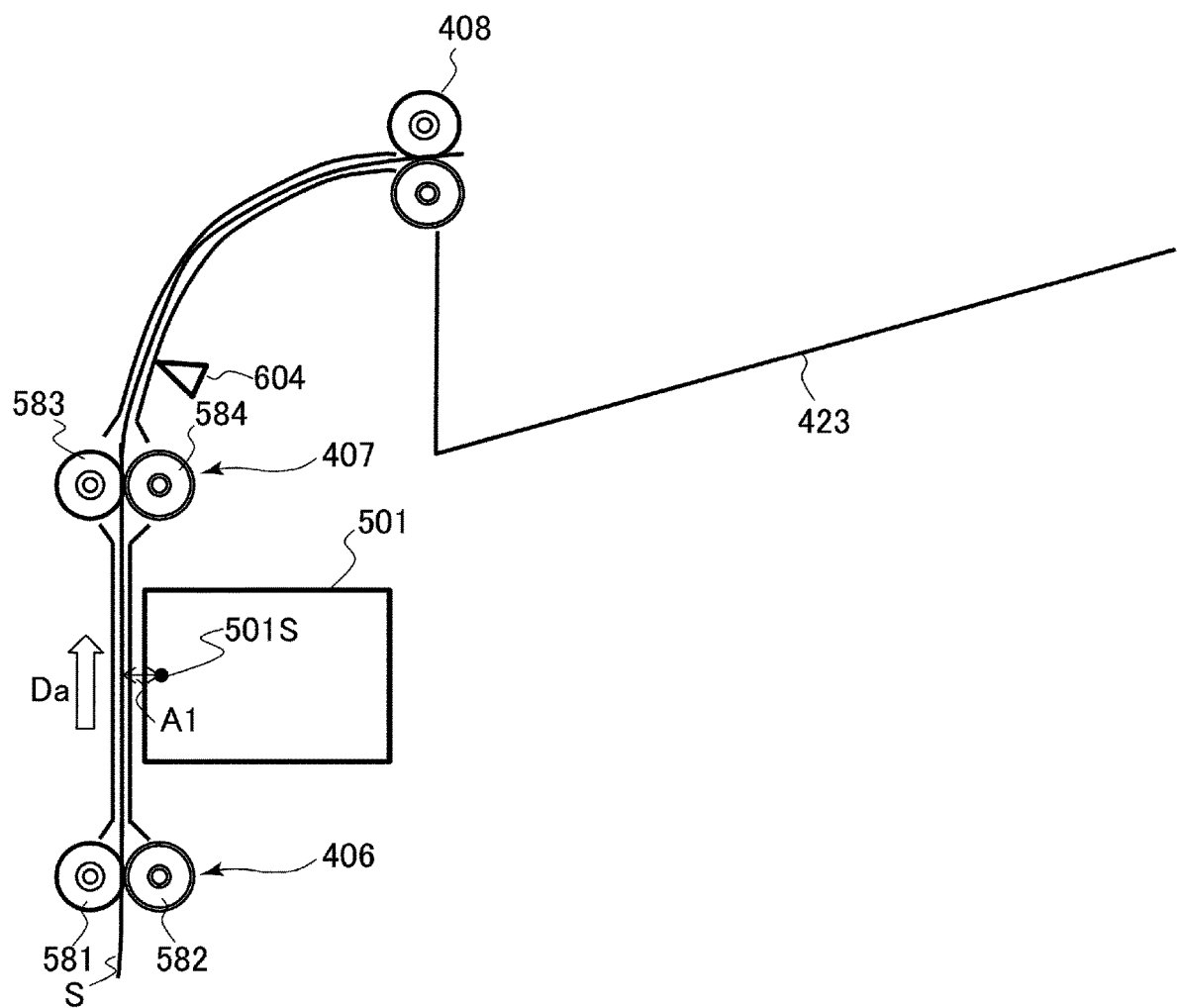

FIG. 9 is a schematic view for illustrating a sheet feeding operation after the color measuring operation in the embodiment 1.

Figure 10:
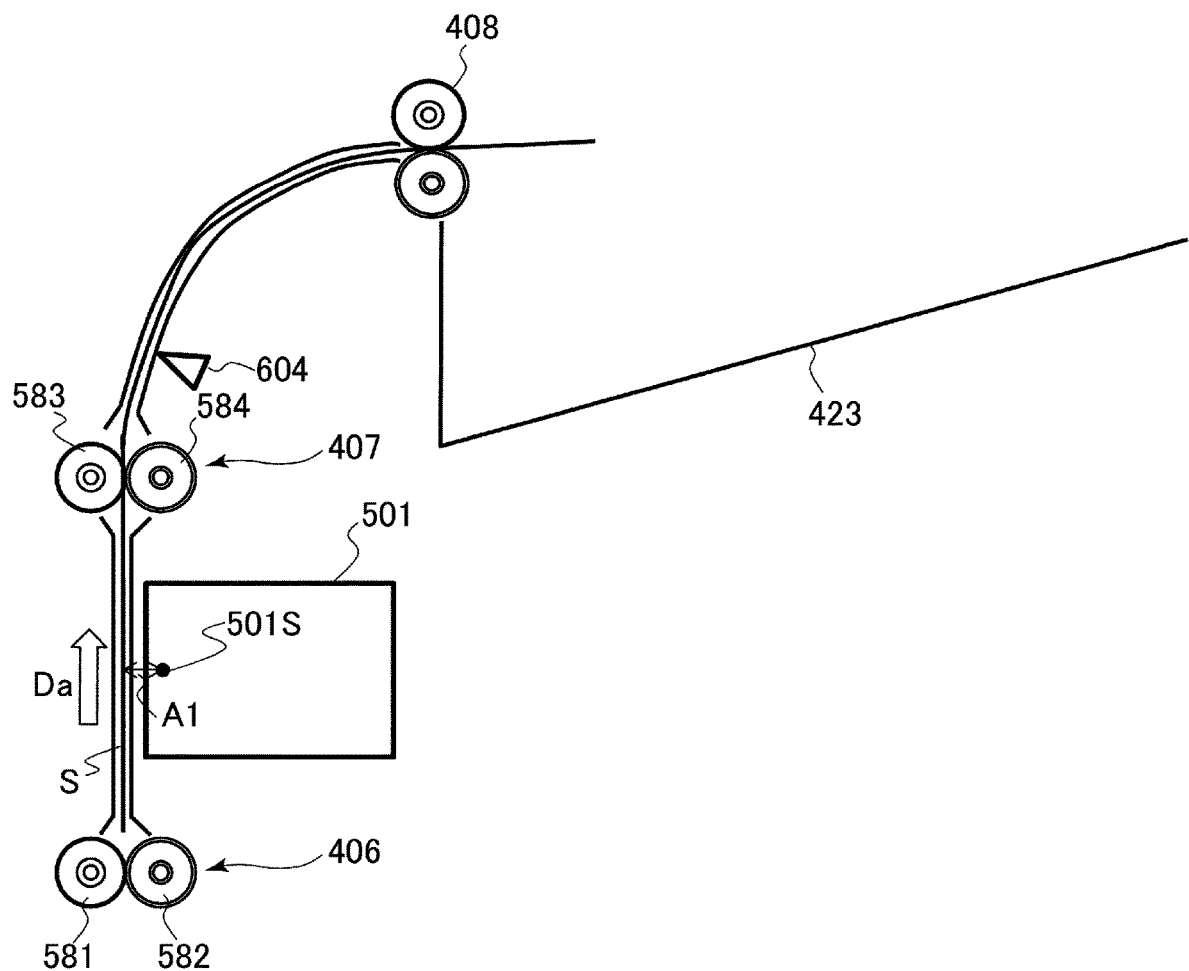

FIG. 10 is a schematic view for illustrating the sheet feeding operation after the color measuring operation in the embodiment 1.

Figure 11:
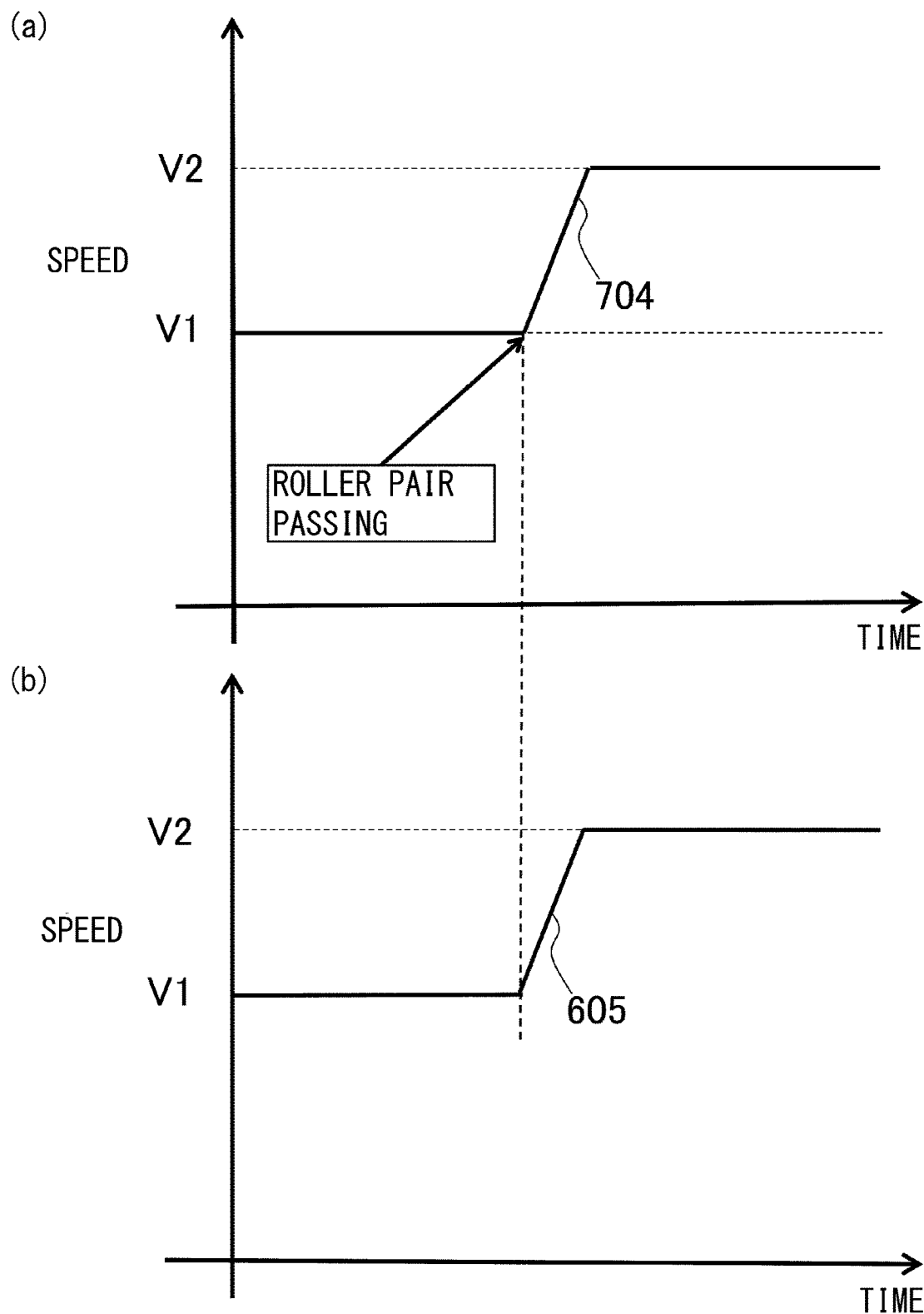

Part (a) of FIG. 11 is a graph showing a moving speed of a sheet trailing end in the embodiment 1, and part (b) of FIG. 11 is a graph showing a driving speed of a discharging roller pair in the embodiment 1.

Figure 12:
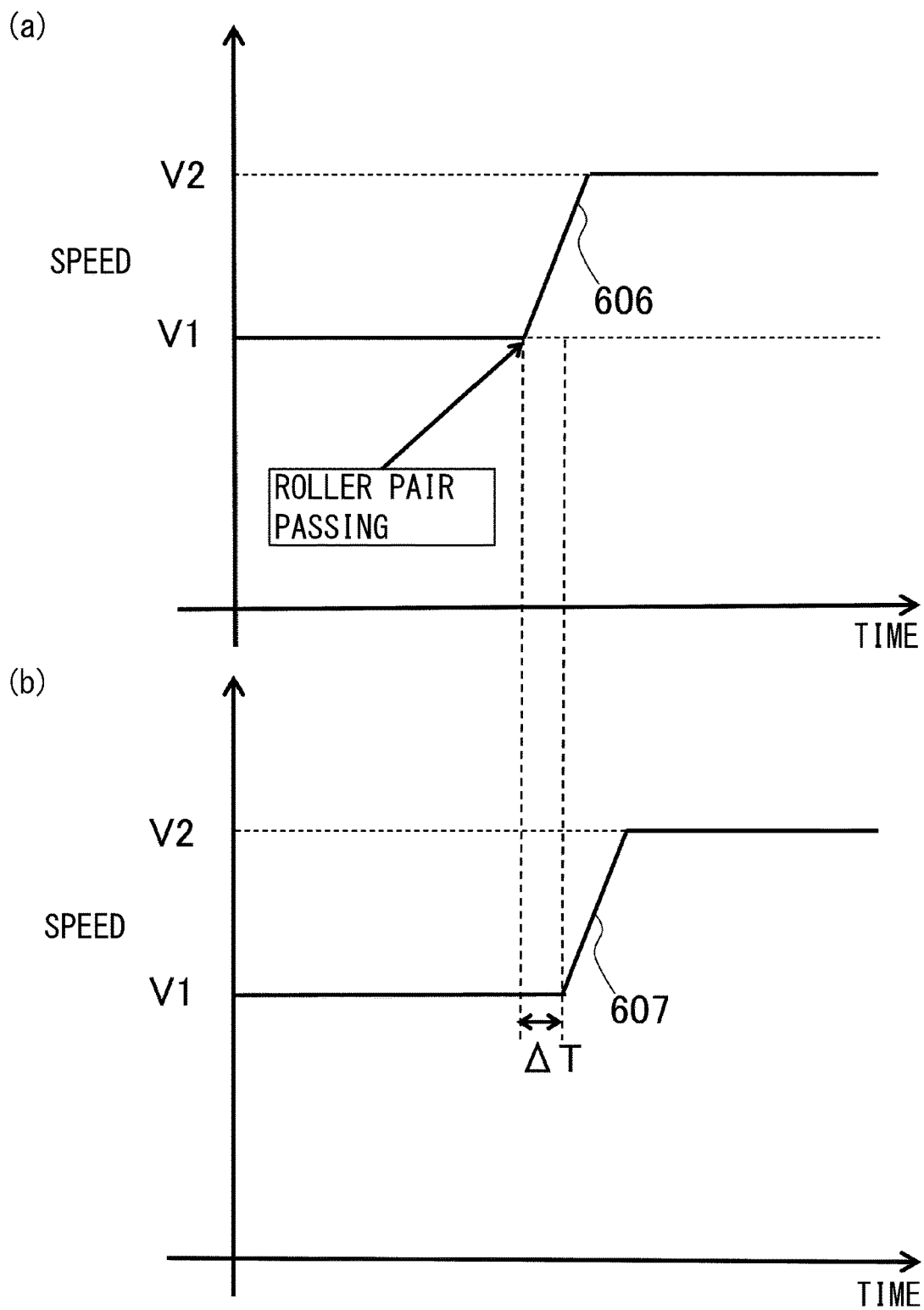

Part (a) of FIG. 12 is a graph showing a moving speed of a sheet trailing end in an embodiment 2, and part (b) of FIG. 12 is a graph showing a driving speed of the discharging roller pair in the embodiment 2.

DESCRIPTION OF THE EMBODIMENTS

In the following, embodiments for carrying out the present invention will be described while making reference to the drawings.

Embodiment 1

Figure 1:
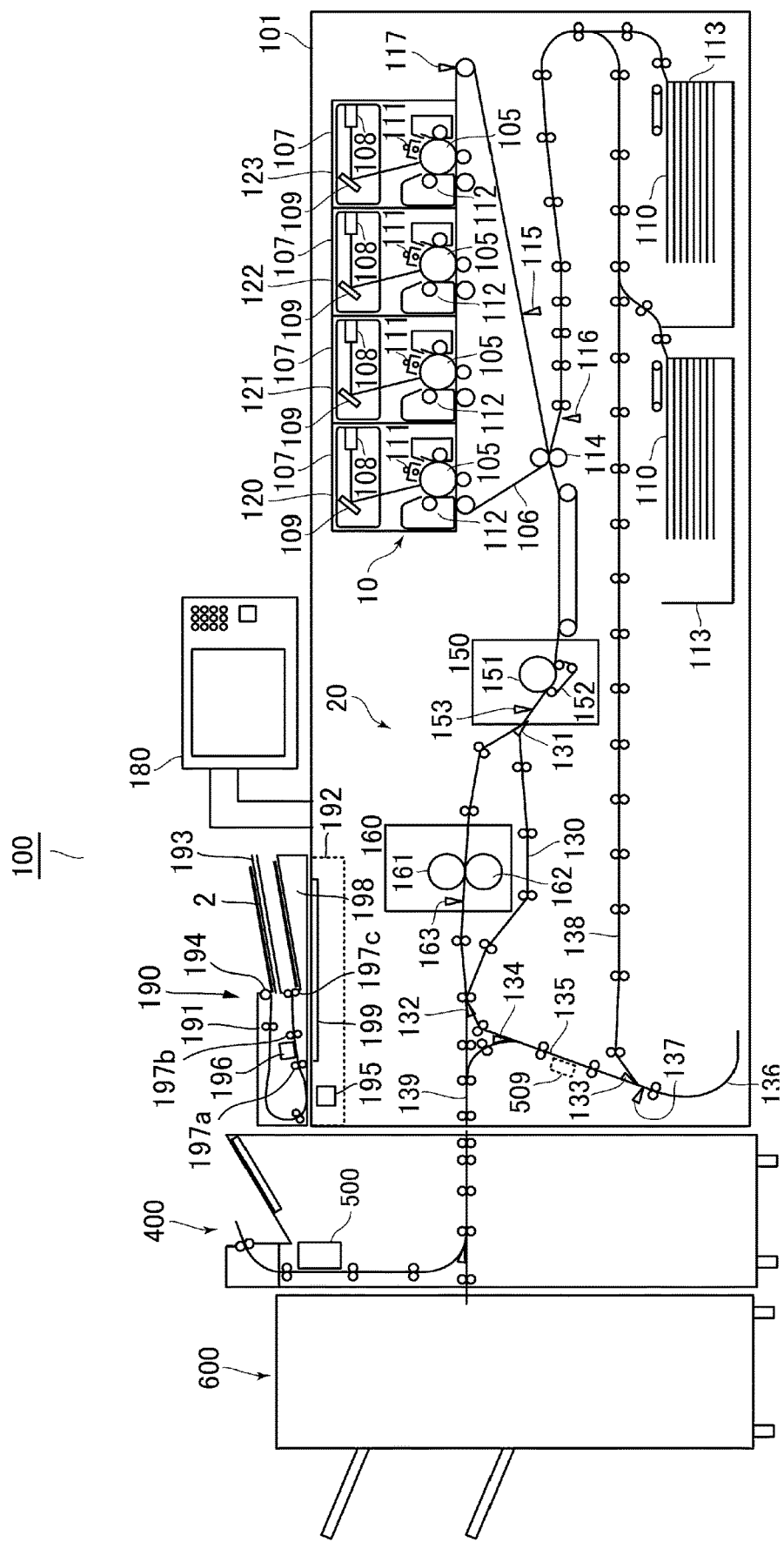
FIG. 1 is a schematic view of an image forming system according to an embodiment 1.

FIG. 1 is a schematic view showing an image forming system 100S according to a first embodiment (embodiment 1). The image forming system 100S includes an image forming apparatus 100, an adjusting unit 400 and a finisher 600. The image forming apparatus 100 is an image forming apparatus in this embodiment, the adjusting unit 400 is a measuring device in this embodiment, and the finisher 600 is a sheet processing device in this embodiment.

In a casing 101 of the image forming apparatus 100, an image forming engine 102 and a control board accommodating portion for accommodating a printer controller described later for controlling an operation of the image forming system 100S including the image forming apparatus 100. The image forming engine 102 in this embodiment includes an optical processing mechanism and a fixing processing mechanism which are used for forming an image on a recording material by an electrophotographic process, and a feeding processing mechanism and a conveying processing mechanism which are used for feeding and conveying a sheet 110 used as the recording material. As the recording material, it is possible to use sheet materials including papers such as plain paper and thick paper, surface-treated papers such as coated paper and embossed paper, a plastic film, a cloth, and the like.

The optical processing mechanism 10 includes stations 120, 121, 122 and 123 for forming toner images of colors of yellow, magenta, cyan and black and includes an intermediary transfer belt 106. In each of the stations 120 to 123, a surface of a photosensitive drum 105 which is a drum-shaped photosensitive member is electrically charged by a primary charger 111. A laser scanner portion 107 performs an exposure process of the photosensitive drum 105 on the basis of an instruction signal which is formed on the basis of the image data and which is sent to the laser scanner portion 107. The laser scanner portion 107 includes a laser driver for turning on and off an unshown semiconductor laser to emit laser light. The laser scanner portion 107 guides the laser light from the semiconductor laser to the photosensitive drum 105 through a reflection mirror 109 while dividing the laser light into portions by a rotatable polygonal mirror with respect to a main scan direction. By this, on the surface of the photosensitive drum 105, an electrostatic latent image corresponding to the image data is formed.

A developing device 112 accommodates therein a developer containing toner and supplies charged toner particles to the photosensitive drum 105. The toner particles are deposited on the drum surface depending on a surface potential distribution, so that the electrostatic latent image carried on the photosensitive drum 105 is visualized as a toner image. The toner image carried on the photosensitive drum 105 is transferred (primary-transferred) onto the intermediary transfer belt 106 to which a voltage of a polarity opposite to a normal charge polarity of the toner is applied. In the case where a color image is formed, toner images formed by the four stations 120 to 123 are multiple-transferred onto the intermediary transfer belt 106 so as to be superposed on each other, so that a full-color toner image is formed on the intermediary transfer belt 106.

On the other hand, the feeding processing mechanism feeds sheets 110 one by one toward a transfer roller 114 from a sheet accommodating portion 113 inserted into the casing 101 of the image forming apparatus 100 so as to be capable of being pulled out. The toner image carried on the intermediary transfer belt 106 which is an intermediary transfer member is transferred (secondary-transferred) onto the sheet 110 by the transfer roller 114.

Around the intermediary transfer belt 106, an image formation start position detecting sensor 115 for determining a print start position when the image formation is carried out, a feeding timing sensor 116 for timing feeding of the sheet 110, and a density sensor 117 are provided. The density sensor 117 measures a density of a patch image carried on the intermediary transfer belt 106. The printer controller adjusts an operation condition (for example, setting of a target charging potential of the primary charger 111 and a bias voltage of the developing device 112) of the optical processing mechanism 10 on the basis of a detection result of the density sensor 117.

The fixing processing mechanism in this embodiment is constituted by a first fixing device 150 and a second fixing device 160. The first fixing device 150 includes a fixing roller 151 for applying heat to the sheet 110, a pressing belt 152 for causing the sheet 110 to press-contact the fixing roller 151, and a first post-fixing sensor 153 for detecting completion of a fixing process by the first fixing device 150. Each of rollers including the fixing roller 151 is a hollow roller and includes therein a heater. The first fixing device 150 applies heat and pressure to the toner image on the sheet 110 while nipping and feeding the sheet 110 by the fixing roller 151 and the pressing belt 152 which constitute a rotatable member pair. By this, the toner particles are melted and then is stuck, so that an image is fixed on the sheet 110.

The second fixing device 160 is disposed downstream of the first fixing device 150 in a feeding passage of the sheet 110. The second fixing device 160 has a function of enhancing glossiness of the image fixed on the sheet 110 by the first fixing device 150 and a function of ensuring a fixing property of the image on the sheet 110. Similarly, as the first fixing device 150, the second fixing device 160 includes a fixing roller 161 and a pressing roller 162 as a rotatable member pair for heating and pressing the image on the sheet 110 while feeding the sheet 110, and a second post-fixing sensor 163 for detecting completion of a fixing process by the second fixing device 160.

Incidentally, depending on a kind of the sheet 110, there is no need to pass the sheet 110 through the second fixing device 160 in some instances. In such a case, the image forming apparatus 100 includes a circumventing feeding passage 130 for discharging the sheet 110 without via the second fixing device 160 for the purpose of reducing energy consumption. The sheet 110 sent from the first fixing device 150 is derived to either one of the second fixing device 160 and the circumventing feeding passage 130 by a first switching flapper 131.

The sheet 110 passed through the second fixing device 160 or the circumventing feeding passage 130 is derived to either one of discharge feeding passage 139 and a reverse feeding passage 135 by a second switching flapper 132. The sheet 110 fed to the reverse feeding passage 135 is then subjected to detection of a position thereof by a reverse sensor 137, so that a leading end and a trailing end of the sheet 110 with respect to a sheet feeding direction are changed to each other by a switch-back operation performed by reversing portion 136. In the case of double-side printing, the sheet 110 on which the image is formed on a first surface thereof is fed toward the transfer roller 114 again via a re-feeding passage 138 in a state in which the leading end and the trailing end of the sheet 110 are changed to each other by the reversing portion 136, and then an image is formed on a second surface of the sheet 110.

The sheet 110 on which image formation of one-side printing is ended or the sheet 110 on which image formation on the second surface of the sheet 110 in the double-side printing is discharged to an outside of the image forming apparatus 100 via the discharge feeding passage 139. Incidentally, between the reverse feeding passage 135 and the discharge feeding passage 139, a switching flapper 134 capable of guiding the sheet 110, switched back by the reversing portion 136, toward the discharge feeding passage 139 is provided. By providing the switching flapper 134, the front (first) surface and the back (second) surface of the sheet 110 when the sheet 110 is discharged from the image forming apparatus 100 are selectable.

At an upper portion of the image forming apparatus 100, an image reading apparatus 190 including a main body portion 192 fixed to the casing 101 of the image forming apparatus 100 and including an automatic original feeding device (automatic document feeder (ADF)) 191 is provided. The ADF 191 includes a feeding tray 193 on which a sheet 2 which is an original is stacked and a discharge tray 198 on which the sheet 2 from which image information is read is discharged. The sheets 2 set on the feeding tray 193 are fed one by one by a feeding unit 194, and the fed sheet 2 is conveyed via conveying roller pairs 197a and 197b. During conveyance, the sheet 2 is optically scanned by image sensors 195 and 196, so that image information of the sheet 2 is read. In an example shown in FIG. 1, the image sensor 195 for reading the image information from one surface of the sheet 2 is provided in the main body portion 192, and the image sensor 196 for reading the image information form the other surface of the sheet 2 is provided at a lower portion of the ADF 191. The sheet 2 from which the image information is read is discharged onto the discharge tray 198 by a discharging roller pair 197c.

Incidentally, at a position opposing a lower surface of the ADF 191, an original (supporting) platen 199 is provided, so that the image reading apparatus 190 is capable of reading the image information from a surface of an object to be read, stationally placed on the original platen 199, by moving the image sensor 195. For this reason, the ADF 191 is connected to the casing 101 of the image forming apparatus 100 via a hinge and is constituted so as to be openable upward from the original platen 199.

The image forming apparatus 100 is provided with an operating portion 180 (FIG. 1) which is a user interface of the image forming system 100S. The operating portion 180 includes a display as a display unit for displaying information to the user. Further, the operating portion 180 is provided with, for example, physical keys such as numeric keys and a print execution button and the like, and a touch panel function of the display as an input unit capable of inputting instructions and data from the user to the image forming system 100S. By the operation of the operating portion 180, the user is capable of inputting pieces of information indicating sheet attributes such as a name, a basis weight and the presence or absence of surface treatment of the sheet 110 set in the sheet accommodating portion 113. The inputted attributes are registered in a sheet library 900 stored in the memory 304.

(Adjusting Unit)

Next, the adjusting unit 400 which is a measuring device of this embodiment will be described. In the image forming system 100S of FIG. 1, the adjusting unit 400 is provided between the image forming apparatus 100 and the finisher 600 with respect to a horizontal direction (left-right direction in the figure). That is, an upstream device of the adjusting unit 400 in this embodiment is the image forming apparatus 100, and a downstream device of the adjusting unit 400 is the finisher 600. The finisher 600 includes a processing portion 601 for subjecting the sheet to processing such as a binding process, a saddle process and the like process, and discharges the processed sheet bundle (or the sheet received form the upstream device in the case where there is no need to perform the processes) as a product of the image forming system 100S.

Incidentally, the devices connected to the adjusting unit 400 on sides upstream and downstream device of the adjusting unit 400 change depending on a constitution of the image forming system 100S. For example, the adjusting unit 400 is not always directly connected to the image forming apparatus 100, but a constitution in which an intermediary unit is provided between the image forming apparatus 100 and the adjusting unit 400 and in which the adjusting unit 400 receives the sheet from the intermediary unit may also be employed. As an example of the intermediary unit, it is possible to cite a device for performing coating such that transparent toner is deposited on an image surface of the image-formed sheet and thus glossiness is imparted to the image. Further, in some cases, a sheet processing device other than the finisher 600 is connected to the adjusting unit 400 on a side downstream of the adjusting unit 400. As an example of such a sheet processing device, it is possible to cite an inserter for inserting a sheet as a cover into the sheet bundle, a trimmer for cutting and uniformizing an end portion of a sheet bundle subjected to binding, and a stacker movable by a hard cart in a state in which a large volume of products is accommodated.

Figure 2:
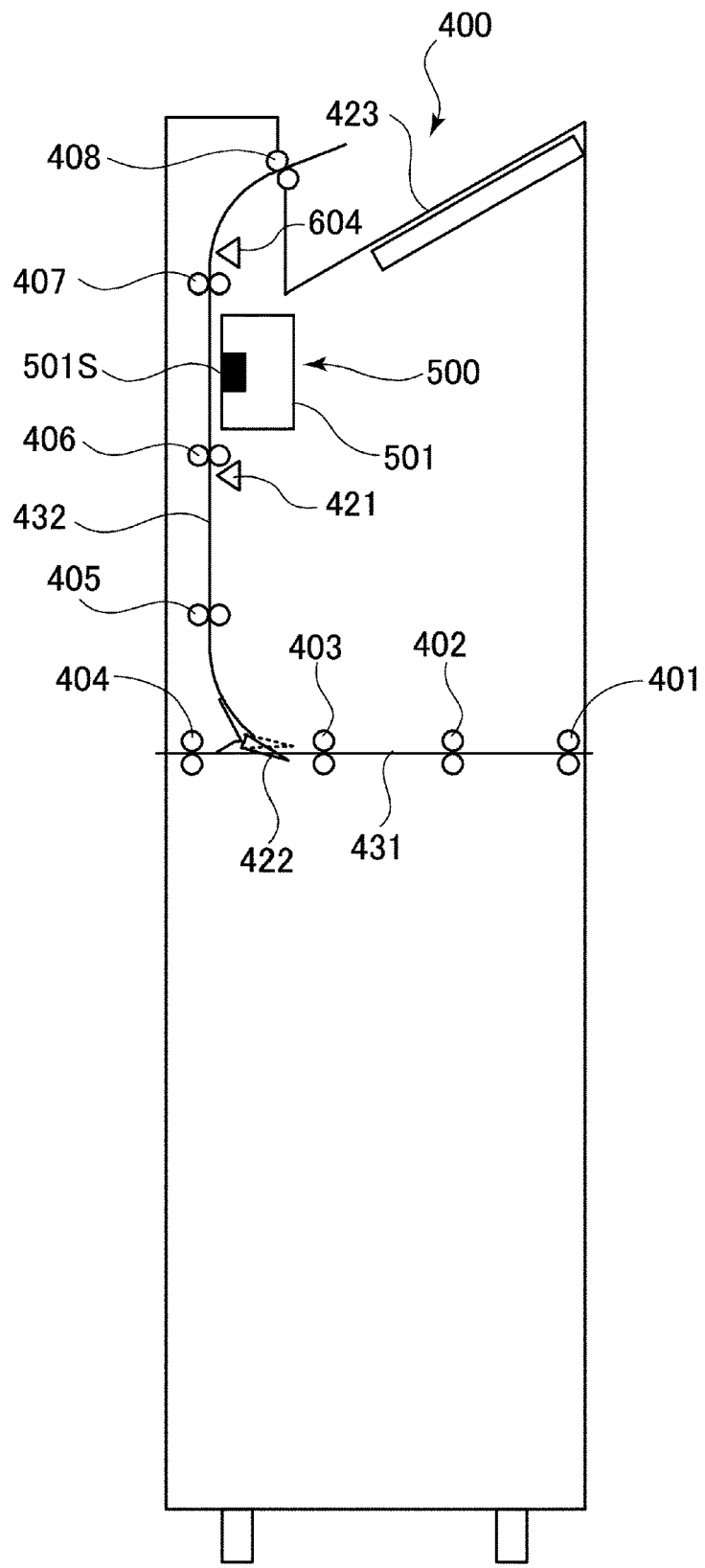
FIG. 2 is a schematic view of an adjusting unit in the embodiment 1.

As shown in FIG. 2, the adjusting unit 400 is provided with a colorimetric unit 500, and a through path 431 and a colorimetric path 432 which constitute a sheet feeding passage in the adjusting unit 400. Further, at an upper portion of a casing of the adjusting unit 400, a discharge tray 423 which is a stacking portion in this embodiment.

The through path 431 is a feeding path along which the sheet discharge from the image forming apparatus 100 is received and fed toward the finisher 600, and extends in a substantially horizontal direction. In the through path 431, a first feeding roller pair 401, a second feeding roller pair 402, a third feeding roller pair 403 and a fourth feeding roller pair 404 are provided in a named order from an upstream side toward a downstream side with respect to the sheet feeding direction.

The colorimetric path 432 branches from the through path 431 and extends upward. In the colorimetric path 432, a first feeding roller pair 405, a second feeding roller pair 406, a third feeding roller pair 407 and a discharging roller pair 408 are provided in a named order from an upstream side toward a downstream side of the colorimetric path 432 with respect to the sheet feeding direction.

Between the second feeding roller pair 406 and the third feeding roller pair 407 in the colorimetric path 432, the colorimetric unit 500 including a color sensor 501 described later is provided. At a branch portion of the colorimetric path 432 and the through path 431, a switching flapper 422 which is a guiding member capable of switching a feeding passage of the sheet between the through path 431 and the colorimetric path 432 is provided.

In the case where measurement of the color by the color sensor is carried out, such as in the case where color adjustment of an output image is carried out during initial setting of the image forming system 100S, the sheet fed from the image forming apparatus 100 to the through path 431 is guided to the colorimetric path 432 by the switching flapper 422. In a period in which the sheet is delivered and fed by the first feeding roller pair 405, the second feeding roller pair 406 and the third feeding roller pair 407 is a named order, which are disposed in the colorimetric path 432, a color of an image on the sheet is measured by the color sensor 501. Then, the sheet is discharged to the discharge tray 423 by the discharging roller pair 408.

Incidentally, in the colorimetric path 432, as a sheet detecting unit for monitoring feeding of the sheet by the adjusting unit 400 or the image forming system 100S, sheet position sensors 421 and 604 are provided. With respect to the sheet feeding direction in the colorimetric path 432, the sheet position sensor 421 is disposed upstream of a measuring position (a light incident portion on which reflected light from the sheet is incident) of the color sensor 501, and the sheet position sensor 604 is disposed downstream of a measuring position of the color sensor 501. As the sheet position sensors 421 and 604, for example, a photo-reflection for detecting reflected light from the sheet by emitting detection light toward a space of the feeding passage and a photo-interruptor for detecting that a flag member projecting toward the feeding passage is swung by being urged by the sheet are usable.

(Color Sensor)

Figure 3:
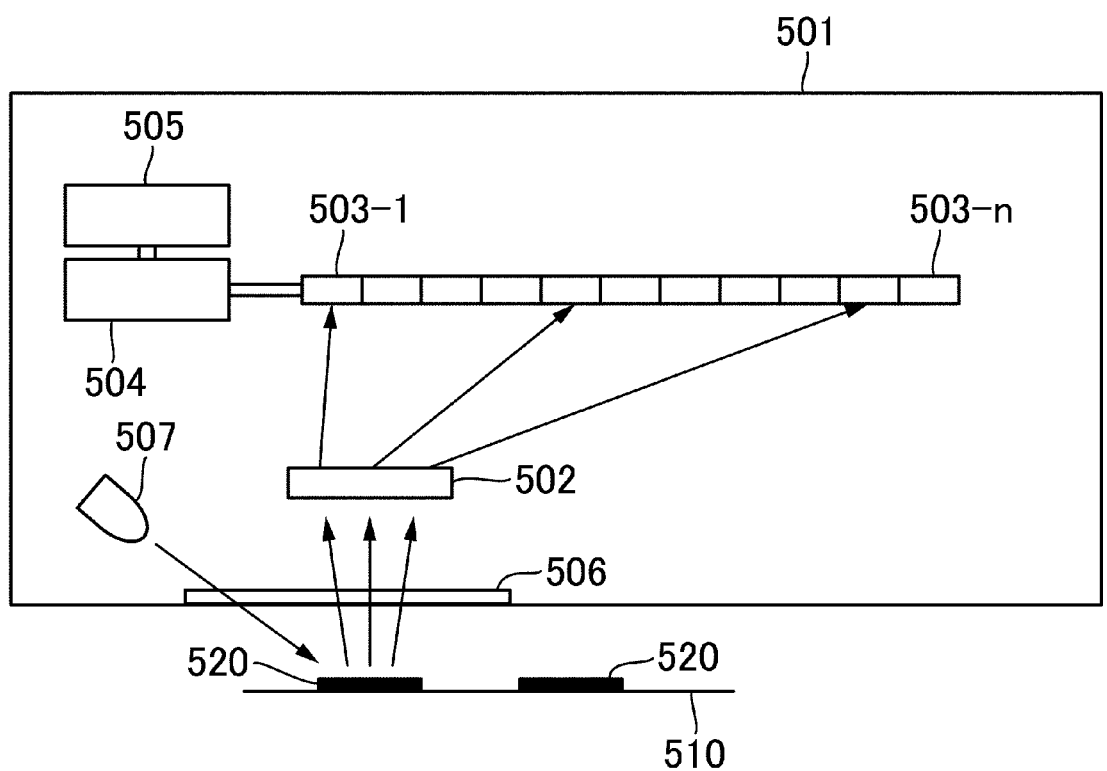
FIG. 3 is a schematic view of a color sensor of a measuring unit in the embodiment 1.

In the following, a structure of the color sensor 501 of the colorimetric unit 500 and a management (control) of the color by using the color sensor 501 will be described. FIG. 3 is a schematic view of the color sensor 501 as a measuring unit in this embodiment. The color sensor 501 is a sensor unit including a white LED 507 which is a light source, a line sensor 503 for detecting light intensity, and an optical system for guiding reflected light from a sheet 510 to the line sensor 503 by emitting the light from the light source to the sheet 510. The white LED 507 irradiates a patch image 520 on the sheet 510 with light having a continuous spectrum. A diffraction grating 502 disperses the light reflected by the patch image 520 for each of wavelengths. The line sensor 503 is constituted by image pick-up elements 503-1, ..., 503-n for n pixels, and measures intensity of light, for each of wavelengths, separated by the diffraction grating 502.

A wavelength area detectable by the line sensor 503 substantially ranges over entirety of a visible light area, and is set in a range of 380 nm to 720 nm, for example. Further, as the image pick-up elements 503-1, ..., 503-n of the line sensor 503, it is possible to utilize a CMOS sensor. Incidentally, in an illustrated structural example, a lens 506 for concentrating light, reflected from the patch image 520, on the diffraction grating 502 is provided.

A detection signal of the line sensor 503 is processed by a processing (calculating) portion 504 mounted in the color sensor 501, and a calculation result is stored in a memory 505. The processing portion 504 includes a spectral processing portion for calculating a spectral reflectance of each of patch images 520 by performing spectral calculation from, for example, a light intensity value.

An outline of a color management method using the color sensor 501 will be described. A color management module (CMM) mounted in the image forming system 100S converts inputted image data to device-independent data of a color space (for example, CIE L*a*b*color space), and thereafter converts the color space data to a signal for forming an image by the image forming engine 102. At this time, a converting method from the device-independent color space to the color space for the image formation is defined by a color profile such as an international color consortium (ICC) profile. The color space for the image formation refers to a signal inputted, as a video signal, to the laser scanner portion 107, for example.

In order that the image forming system 100S outputs the image with high reproducibility relative to the inputted image data, there is a need to set a proper color profile. Therefore, in the image forming system 100S, the color of the image formed on the sheet by the image forming engine 102 is measured by the color sensor 501, so that a degree of approximation between a color of the inputted image data and a color represented by a measurement result is evaluated. As an evaluation criterion, for example, satisfaction of ΔE>4 in accordance with a color matching accuracy standard defined by ISO 12647-7 is employed. However, ΔE is a Euclidean distance between two points (for example, in CIE L*a*b*color space). The color profile is changed so as to satisfy the predetermined evaluation criterion, so that a color, a density and the like of the image outputted for the same inputted image data by the image forming engine 102 are adjusted and thus an output image high in color reproducibility is obtained.

Incidentally, an image to be measured may also be an image test-printed as an image outputted in a current image forming job and may also be a test chart determined in advance by a standard such as ISO 12642. In the following description of a moving unit, the description will be made as that patch images each having a transfer size and a predetermined shape are arranged in a lattice shape are subjected to a measuring operation by the color sensor 501.

Further, in this embodiment, the color sensor of a spectral type was described as an example, but another measuring unit (for example, an image sensor unit including a combination of LEDs of three colors with a charge coupled device) capable of measuring the color of the image on the sheet may also be used.

(Moving Unit)

Figure 4:
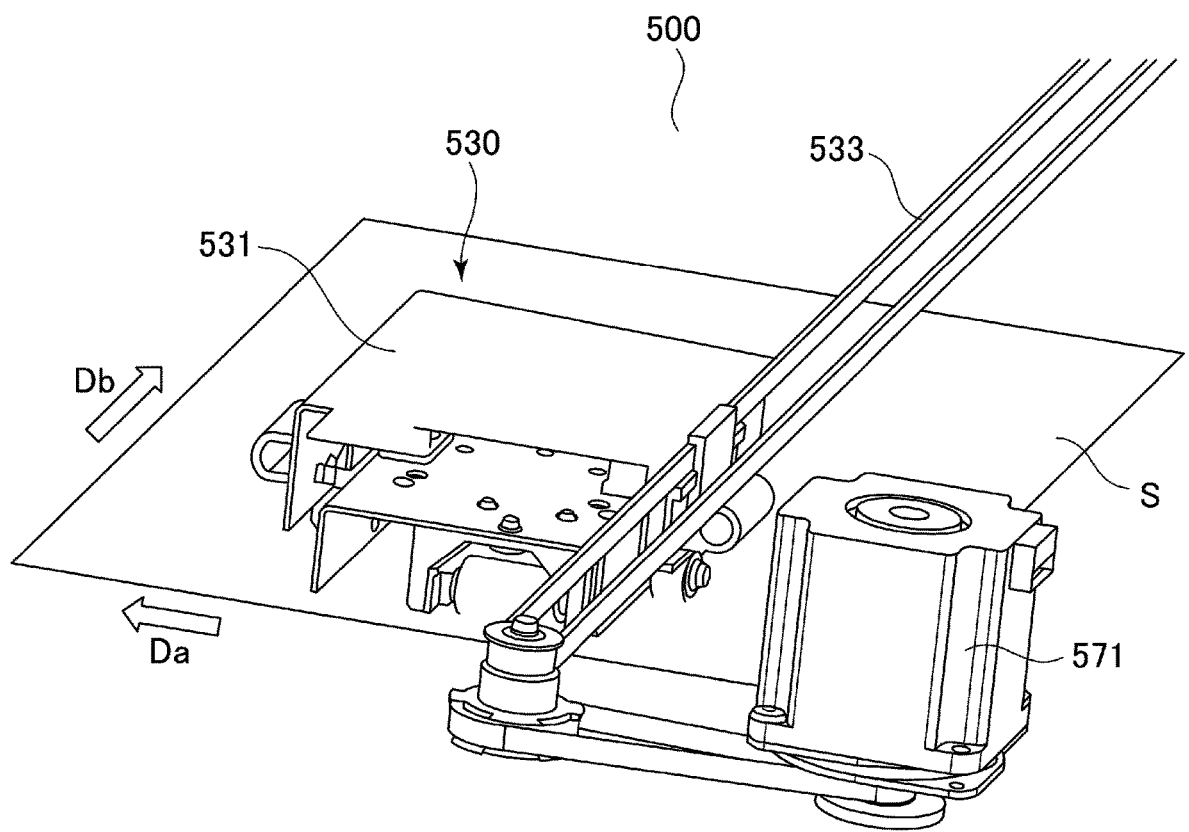
FIG. 4 is a schematic view of a moving unit of the measuring unit in the embodiment 1.
Figure 5:
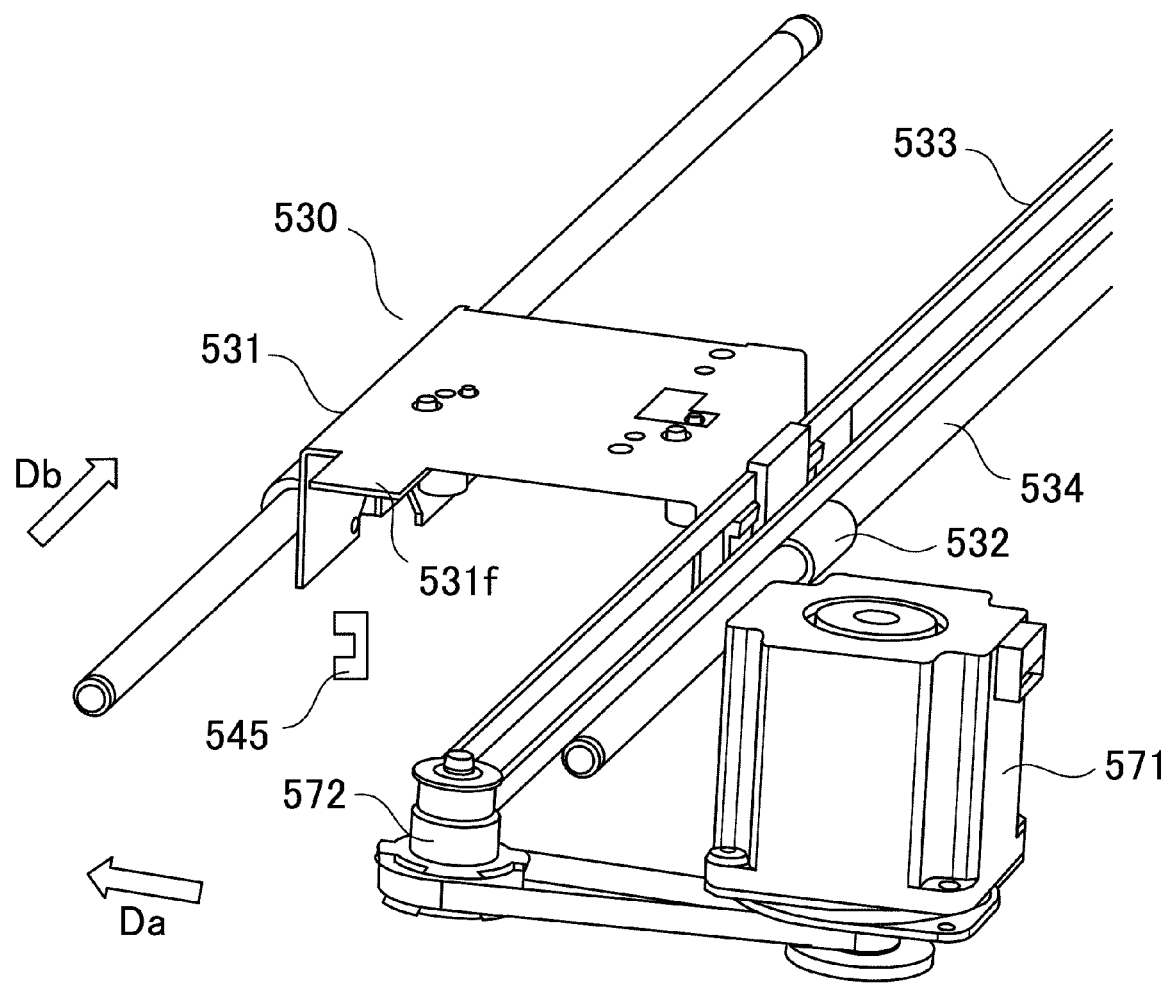
FIG. 5 is a schematic view of the moving unit of the measuring unit in the embodiment 1.
Figure 6:
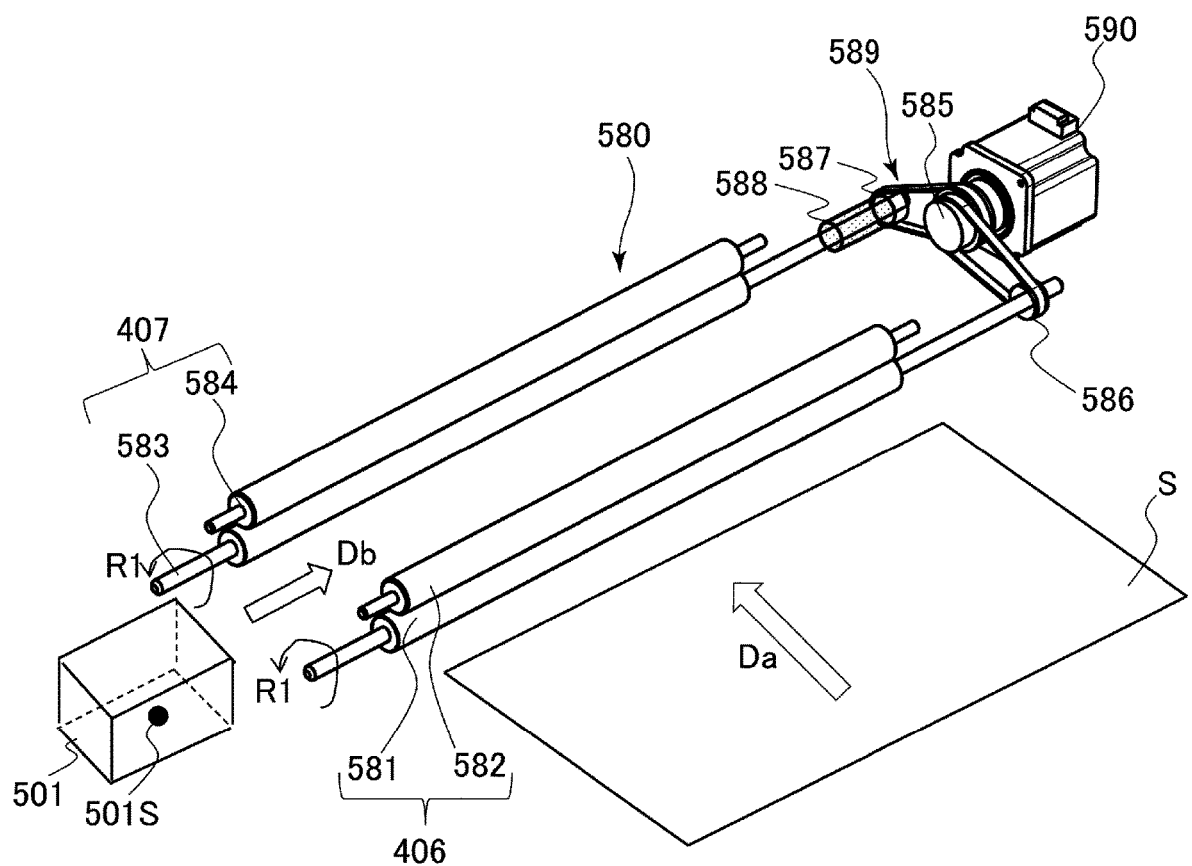
FIG. 6 is a schematic view of a feeding unit of the measuring unit in the embodiment 1.
Figure 7:
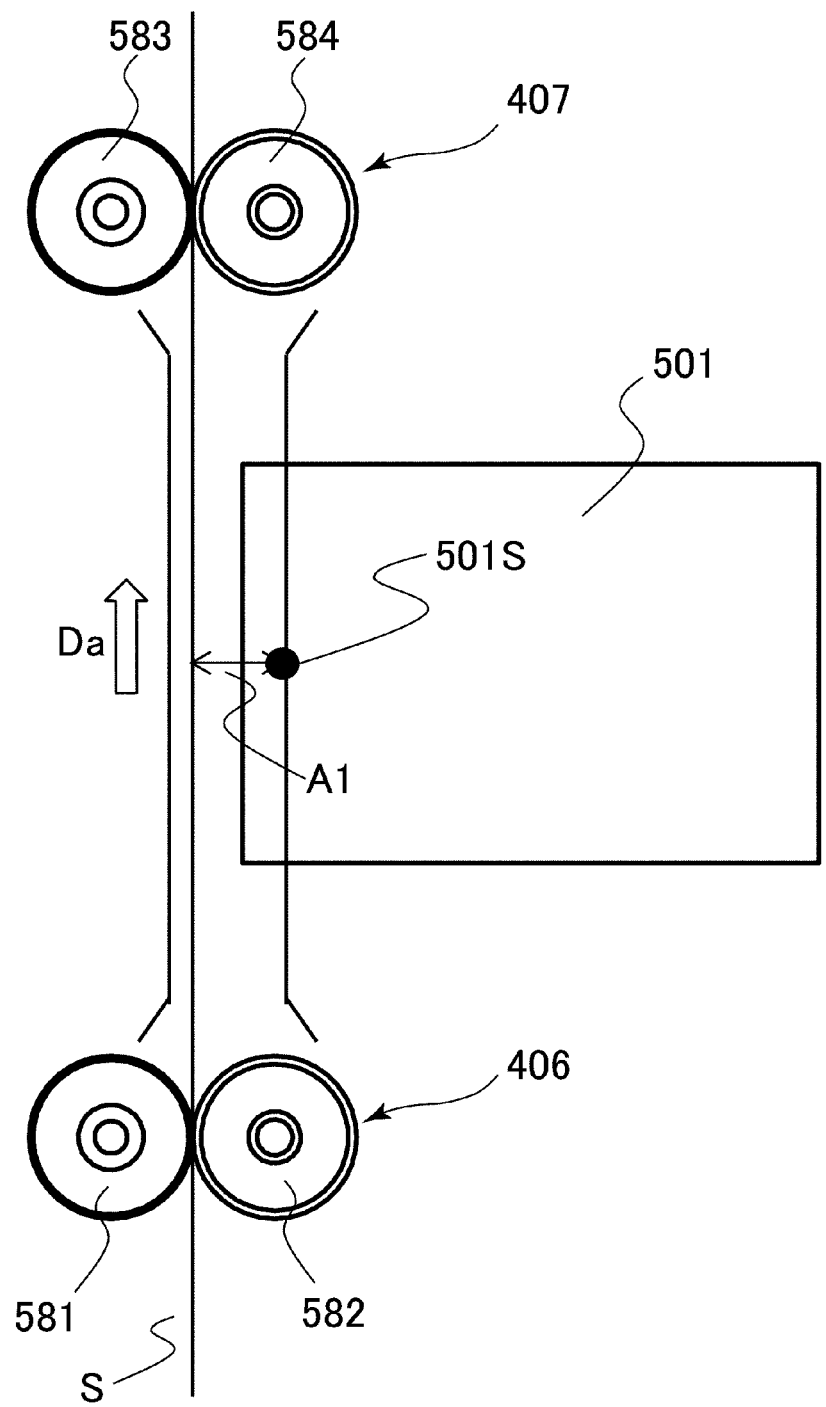
FIG. 7 is a schematic view of the feeding unit of the measuring unit in the embodiment 1.

Other portions of the colorimetric unit 500 will be described. As shown in FIGS. 4 and 5, the colorimetric unit 500 includes a moving unit 530 for moving the color sensor 501, a moving motor 571 for driving the moving unit 530, and a slide position sensor 545 for detecting the position of the color sensor 501. Further, as shown in FIGS. 6 and 7, as peripheral parts of the colorimetric unit 500, a feeding unit 580 for feeding the sheet, and a feeding motor 590 for driving the feeding unit 580 are provided. The feeding unit 580 includes a second feeding roller pair 406 as a first roller pair in this embodiment, a third feeding roller pair 407 as a second roller pair in this embodiment, and a drive transmitting portion 589 for transmitting a driving force of the feeding motor 590.

In the following, unless otherwise specified, a direction in which the sheet S is fed from the second feeding roller pair 406 toward the third feeding roller pair 407 is referred to as a "sheet feeding direction Da". A widthwise direction (axial direction of a rotational axis of each of the second feeding roller pair 406 and the third feeding roller pair 407) perpendicular to the sheet feeding direction Da is referred to as a "main scan direction Db".

The colorimetric unit 500 is constituted so as to measure the color by the color sensor 501 while moving the color sensor 501 in the main scan direction Db by the moving unit 530 after receiving the sheet S fed in the sheet feeding direction Da along the colorimetric path 432.

First, the moving unit 530 will be described using FIGS. 4 and 5. The moving unit 530 includes a moving shaft 534 and a moving belt 533 which extend in the main scan direction Db, and includes a movement supporting plate 531 movable along the moving shaft 534. The movement supporting plate 531 supports the color sensor 501. The movement supporting plate 531 is provided with a bearing 532 slidably engageable with the moving shaft 534, and the bearing 532 has a tooth surface engaging with the moving belt 533. The moving belt 533 is stretched by two pulleys 572 (only one of which is shown in FIGS. 4 and 5) spaced from each other in the main scan direction Db, and is rotated with rotation of the moving motor 571.

That is, the moving unit 530 is constituted so that the color sensor 501 is reciprocated in the main scan direction Db by moving the movement supporting plate 531 through rotation of the moving belt 533 by a driving force of a moving motor 571. Incidentally, the adjusting unit 400 is provided with the slide position sensor 545 as a detecting unit for detecting the color sensor 501.

As the slide position sensor 545, a photo-interruptor in which light is blocked by a flag portion 531f provided on the movement supporting plate 531 can be used. In the case where a stepping motor is used as the moving motor 571, it is possible to carry out positional control of the color sensor 501 with respect to the main scan direction Db by counting the number of driving pulses of the motor from a timing when an on state and an off state of the slide position sensor 545 are switched to each other.

Next, description of the feeding unit 580 will be described using FIG. 6. The feeding unit 580 includes a driving roller 581 and a follower roller 582 which constitute the second feeding roller pair 406 provided on a side upstream of the color sensor 501 and includes a driving roller 583 and a follower roller 584 which constitute the third feeding roller pair 407 provided on a side downstream of the color sensor 501, and includes the drive transmitting portion 589.

The drive transmitting portion 589 is constituted by a driving pulley 585 mounted on an output shaft of the feeding motor 590, follower pulleys 586 and 587 connected to the driving rollers 581 and 583, respectively, a belt connecting the driving pulley 585 and the follower pulley 586, and a belt connecting the driving pulley 585 and the follower pulley 587. When the feeding motor 590 is rotated, by a driving force transmitted through the drive transmitting portion 589, the driving rollers 581 and 583 are rotationally driven in a rotational direction R1 along the sheet feeding direction Da, so that the follower rollers 582 and 584 are rotated by rotation of the driving rollers 581 and 583, respectively.

Here, as regards the feeding unit 580 in this embodiment, a feeding speed of the downstream-side third feeding roller pair 407 is set at a value larger than a value of a feeding speed of the upstream-side feeding roller pair 406. However, the feeding speeds refer to peripheral speeds of the driving rollers 581 and 583. For example, as regards the driving pulley 585 provided on the output shaft of the feeding motor 590, the number of teeth of a tooth surface connected to the third feeding roller pair 407 may only be required to be made larger than the number of teeth connected to the second feeding roller pair 406. By this, a ratio (speed ratio) of an angular speed of the driving roller 581 to an angular speed of the output shaft of the feeding motor 590 can be made smaller than a ratio (speed ratio) of an angular speed of the driving roller 583 to the angular speed of the output shaft of the feeding motor 590. However, a method of creating a difference in feeding speed is not limited thereto, but for example, an outer diameter of the upstream-side driving roller 581 may also be set so as to be smaller than an outer diameter of the downstream-side driving roller 583.

Thus, in this embodiment, a difference in feeding speed between the second feeding roller pair 406 and the third feeding roller pair 407 is provided in a simple constitution in which the second feeding roller pair 406 and the third feeding roller pair 407 are driven in by a single feeding motor 590. For this reason, in a state in which the sheet is nipped and fed by both the second feeding roller pair 406 and the third feeding roller pair 407, tension acts on the sheet. By this, a distance from a light incident portion 501S (lens 506 in FIG. 3) of the color sensor 501 to the sheet is stabilized, and thus contributes to an improvement in measurement accuracy of the color sensor 501.

Further, in this embodiment, the follower pulley 587 and the driving roller 583 of the third feeding roller pair 407 are not fixed to each other, and are connected to each other via a torque limiter 588. The torque limiter 588 is divided into, for example, an inner ring portion and an outer ring portion, and the inner ring portion is mounted on a roller shaft of the driving roller 583 and the outer ring portion is connected to the follower pulley 587. In this case, when load of a predetermined torque value or more is exerted on the torque limiter 588, a slip generates between the inner ring portion and the outer ring portion (i.e., the torque limiter 588 idles), and when the load is less than the predetermined torque value, the inner ring portion and the outer ring portion of the torque limiter 588 are rotated integrally with each other. However, a structure of the torque limiter is not limited to the above-described structure as long as the drive transmission is interrupted when the load of the predetermined torque value or more is exerted on the torque limiter 588.

The torque value of the torque limiter 588 is set so as to permit the torque limiter 588 idles through pulling of the third feeding roller pair 407 by the sheet. On the other hand, the driving roller 581 of the second feeding roller pair 406 and the pulley 586 are connected to each other so as not to rotate relative to each other. For this reason, in a period in which the sheet is nipped and fed between both the second feeding roller pair 406 and the third feeding roller pair 407, the third feeding roller pair 407 is pulled by the sheet, so that a slip of the torque limiter 588 generates. Then, the third feeding roller pair 407 rotates at a peripheral speed equal to a peripheral speed of the second feeding roller pair 406 lower than the set feeding speed.

By disposing the above-described torque limiter 588, it is possible to prevent that an excessive load is acts on each of portions of the feeding unit 580 by tension of the sheet, so that durability of the device can be improved.

Incidentally, as an alternative constitution for enhancing measurement accuracy of the color sensor 501, it would be considered that a pressing member for pressing the sheet is provided at a position opposing the light incident portion 501S of the color sensor 501, but this leads to upsizing and complication of the device. Further, as another alternation constitution, it would be considered that a color sensor 501 with a large depth of field is used, but there is a liability that an optical system becomes complicated and a cost is increased. According to this embodiment, it is possible to ensure the measurement accuracy of the color sensor 501 by the simple constitution.

(Color Measuring Operation)

An operation (color measuring operation) for measuring a color of a patch image P of a test chart by the color sensor 501 will be described using FIGS. 7 to 9. As shown in FIG. 7, it is assumed that until a timing when the color measuring operation is started, a leading end (downstream end with respect to the sheet feeding direction Da) of the sheet S reaches the downstream-side belt feeding roller pair 407 and the sheet S is nipped and fed by the second feeding roller pair 406 and the third feeding roller pair 407. Incidentally, a position of the sheet S with respect to the sheet feeding direction Da is controlled on the basis of a driving amount of the feeding motor 590 from a detection timing when the leading end of the sheet is detected by, for example, the sheet position sensors 421 and 604 (FIG. 2).

As shown in FIG. 8, patch images are formed on the sheet S in m rows from P1 to Pm, and a patch image group in each row is constituted by n patch images P1-1, P1-2, P1-3, . . . , P1-n. That is, in the following, a test chart on which the patch images are formed on a single sheet in a lattice shape with m rows and n columns would be considered.

When the sheet S is fed to a measuring position of the color sensor 501, as shown in part (a) of FIG. 8, the color sensor 501 is on stand-by at a position retracted from a passing range of the sheet S with respect to the main scan direction Db. When the patch image P1 in a leading row reaches the position of the light incident portion 501S of the color sensor 501 with respect to the sheet feeding direction, feeding of the sheet S is stopped (interrupted). Then, as shown in part (b) of FIG. 8, the color sensor 501 reads the color of the n patch images (P1-1 to P1-n) through movement thereof in the main scan direction Db.

Thereafter, as shown in part (c) of FIG. 8, feeding of the sheet S is resumed in a state in which the color sensor 501 is moved to out of the passing image of the sheet S with respect to the main scan direction Db. When the patch images P2 in the second row reach the position of the light incident position 501S of the color sensor 501 with respect to the sheet feeding direction Da, the feeding of the sheet S is stopped. Then, the color sensor 501 moves in the main scan direction Db and reads the n patch images P2-1 to P2-n.

A feeding operation of the sheet S and a reciprocating operation of the color sensor 501 which are as described above are repeated, so that the colors of all the patch images in the lattices with the m rows and n columns. In a process thereof, as shown in FIG. 9, the leading end of the sheet S is delivered to the discharging roller pair 408.

As described above, the speed difference is provided between the second feeding roller pair 406 and the third feeding roller pair 407 which are disposed on sides upstream and downstream, respectively, of the color sensor 501, so that as shown in FIG. 7, the sheet S is in a stretched state when the sheet S is temporarily at rest during the color measuring operation. For that reason, the color sensor 501 is capable of measuring the color of the patch image in a state in which the color sensor 501 and a distance A1 from the light incident portion 501S to the sheet S are stabilized. In order to create proper tension on the sheet S, for example, it was suitable that the feeding speed of the downstream-side third feeding roller pair 407 is set at a value larger than a value of the upstream-side second feeding roller pair 406 by 10%.

(Sheet Feeding after Color Measuring Operation)

As shown in FIG. 10, a trailing end (upstream end with respect to the sheet feeding direction Da) of the sheet S passes through the second feeding roller pair 406 disposed on the side upstream of the color sensor 501, the sheet S is further fed by the third feeding roller pair 407 and the discharging roller pair 408. At this time, the tension does not act on the sheet S at a timing when the trailing end of the sheet S passes through the second feeding roller pair 406, and therefore, the torque limiter 588 is in a connected state, so that the peripheral speed of the third feeding roller pair 407 is accelerated. Further, in synchronism with the acceleration of the third feeding roller pair 407, a driving motor for the discharging roller pair 408 is subjected to accelerated control so that the peripheral speed of the discharging roller pair 408 increases. In other words, in accordance with a timing when the trailing end of the sheet S passes through the first roller pair disposed on the side upstream of the measuring unit, a driving speed of the third roller pair disposed downstream of the second roller pair disposed on the side downstream of the measuring unit is accelerated from a first speed (V1) to a second speed (V2) higher than the first speed (V1).

Part (a) of FIG. 11 shows a movement speed 704 of the trailing end of the sheet S. It is understood that the movement speed of the sheet S is accelerated from the feeding speed V1 of the second feeding roller pair 406 to the feeding speed V2 of the third feeding roller pair 407 by passing of the trailing end of the sheet S through the second feeding roller pair 406. Part (b) of FIG. 11 shows a movement speed 605 (peripheral speed of the driving roller of the discharging roller pair 408) of the discharging roller pair 408, and shows that the discharging roller pair 408 is accelerated in accordance with timing of passing of the trailing end of the sheet S through the second feeding roller pair 406.

In this embodiment, with suppression of a fluctuation in sheet position during the color measuring operation by providing a speed difference between the feeding roller pairs disposed on the sides upstream and downstream, respectively, of the color sensor 501, the movement speed of the sheet is accelerated when the trailing end of the sheet passes through the upstream-side feeding roller pair. On the other hand, the discharging roller pair 408 is also accelerated in synchronism with the acceleration of the sheet, so that occurrence of a crease and pressing of the sheet between the third feeding roller pair 407 and the discharging roller pair 408 are suppressed and thus the sheet can be stably fed.

Incidentally, the peripheral speed of the discharging roller pair 408 before the acceleration may preferably be substantially equal to the feeding speed of the second feeding roller pair 406 as shown in part (a) and (b) of FIG. 11. Similarly, the peripheral speed of the discharging roller pair 408 after the acceleration may preferably be substantially equal to the feeding speed of the third feeding roller pair 407 in a state in which there is no slip of the torque limiter 588.

Further, a "timing when the trailing end of the sheet passes through the second feeding roller pair 406" which is acceleration timing of the discharging roller pair 408 is discriminated on the basis of a detection signal of the sheet position sensor 421 or 604 (FIG. 2). For example, a timing of a lapse of a predetermined timing from a timing (detection timing) when a detection signal indicating passing of the trailing end of the sheet is outputted by the sheet position sensor 421 disposed upstream of the second feeding roller pair 406 is the "timing when the trailing end of the sheet passes through the second feeding roller pair 406". The predetermined timing is a required timing when the trailing end of the sheet moves at the feeding speed V1 from the sheet position sensor 421 to the second feeding roller pair 406. Further, it is also possible to acquire the "timing when the trailing end of the sheet passes through the second feeding roller pair 406" on the basis of an elapsed time from a detection timing when a detect signal indicating the passing of the trailing end of the sheet is outputted by the sheet position sensor 604 disposed downstream of the second feeding roller pair 406.

Embodiment 2

Next, a second embodiment (embodiment 2) will be described. In this embodiment, acceleration timing of the discharging roller pair 408 is different from the acceleration timing in the embodiment 1. Constituent elements represented by reference numerals or symbols common to the embodiment 1 and this embodiment have substantially the same constitutions and functions, and in this embodiment, a portion different from the embodiment 1 will be principally described.

Parts (a) and (b) of FIG. 12 correspond to parts (a) and (b) of FIG. 12, respectively, in which part (a) of FIG. 12 represents a movement speed 606 of the trailing end of the sheet, and part (b) of FIG. 12 represents a driving speed 607 of the discharging roller pair 408. Similarly as in the embodiment 1, it is understood that the trailing end of the sheet passes through the second feeding roller pair 406 after the color measuring operation and then the sheet movement speed 606 is accelerated from the feeding speed V1 of the second feeding roller pair 406 to the feeding speed V2 of the third feeding roller pair 407 (part (a) of FIG. 12). Further, the driving speed (V2) of the discharging roller pair 408 after the trailing end of the sheet passes through the second feeding roller pair 406 is set at a value larger than a value of the driving speed (V1) of the discharging roller pair 408 before the trailing end of the sheet passes through the second feeding roller pair 406.

Here, as regards the acceleration timing of the discharging roller pair 408 in this embodiment, a delay time ΔT is set relative to a timing when the trailing end of the sheet passes through the second feeding roller pair 406. The reason why such a delay time ΔT is provided will be described below.

First, a time from the timing when the trailing end of the sheet passes through the second feeding roller pair 406 until the torque limiter 588 released from the tension of the sheet is changed in state from a connection-released state to a connected state can vary. A deviation amount of a change (transition) time of such a torque limiter 588 is referred to as ΔT1.

Further, the timing when the trailing end of the sheet passes through the second feeding roller pair 406 can be determined on the basis of the detection timing of the sheet position sensor 421 or 604 as described above, but a variation occurs in timing when the trailing end of the sheet actually passes through the second feeding roller pair 406. Such a variation in trailing end passing timing occurs due to a tolerance of an outer diameter of the third feeding roller pair 407, a sheet position variation when the sheet position sensors 421 and 604 output the detection signals, and the like. With respect to a calculative timing when the trailing end of the sheet passes through the second feeding roller pair 406, a fluctuation amount of a timing when the trailing end of the sheet actually passes through the second feeding roller pair 406 is referred to as ΔT2.

From the above, with respect to the calculative timing when the trailing end of the sheet passes through the second feeding roller pair 406, a timing when the torque limiter 588 is in the connected state and then the acceleration of the sheet occurs is capable of varying with a duration of a time of about (ΔT1+ΔT2). That is, if the discharging roller pair 408 is accelerated just at the above-described calculative time, for the time of about (ΔT1+ΔT2), there is a possibility that a state in which the feeding speed of the discharging roller pair 408 is higher than the peripheral speed of the third feeding roller pair 407 is formed and thus mutual pulling of the sheet between the discharging roller pair 408 and the third feeding roller pair 407 occurs.

Therefore, in this embodiment, the acceleration timing of the discharging roller pair 408 is set at a time of a lapse of ΔT=ΔT1+ΔT2 from the calculation timing when the trailing end of the sheet passes through the second feeding roller pair 406. By this, a timing when the acceleration of the discharging roller pair 408 is started is after the acceleration of the peripheral speed of the third feeding roller pair 407 is started, so that it is possible to suppress damage on the sheet and an overload on a motor and the like due to the pulling of the sheet between the roller pairs 407 and 408.

In this embodiment, similarly as in the embodiment 1, in a simple constitution in which the second feeding roller pair 406 and the third feeding roller pair 407 are driven by the single feeding motor 590, a difference in feeding speed is provided between the second feeding roller pair 406 and the third feeding roller pair 407. By this, a distance from the color sensor 501 to the sheet is stabilized, and thus contributes to improvement in measurement accuracy of the color sensor 501. Further, by disposing the torque limiter 588, an excessive load is prevented from acting on the respective portions of the feeding unit 580 due to the tension of the sheet, so that durability of the device can be improved.

In addition, in this embodiment, as regards the acceleration timing of the discharging roller pair 408, the delay time ΔT is sets, so that it becomes possible to prevent the above-described mutual pulling of the sheet leading to the damage on the sheet and the excessive load on the motor and the like, by the acceleration of the discharging roller pair 408.

Other Embodiments

In the above-described embodiments, the adjusting unit 400 provided with the colorimetric unit 500 including the color sensor 501 was described as an example, but the present invention may also be applied to an image reading apparatus in which a reading unit for reading the image information from the sheet is provided in place of the color sensor 501. For example, the image reading apparatus 190 shown in FIG. 1 includes the image sensor 196 as the reading unit. In this case, it is possible to apply the above-described constitutions in which the feeding roller pair 197a, the feeding roller pair 197b and the discharging roller pair 197c are used as a first roller pair, a second roller pair and a third roller pair, respectively. Further, the image reading apparatus is not limited to the image reading apparatus incorporated in the image forming apparatus (system), but may also be image reading apparatuses for other uses, such as a bar code reader, an inspection device for a sheet-like product, and the like.

Further, in the above-described embodiments, the image forming system 100S in a state in which the adjusting unit 400 as the measuring device is connected to a side portion of the image forming apparatus 100 was described. Instead of this, the present invention may also be applied to an image forming system in which a function of the adjusting unit 400 is incorporated in the same casing including the image forming engine 102. For example, as indicated by a broken line in FIG. 1, a color sensor 509 as a measuring unit may also be provided in a reverse feeding passage in the image forming apparatus 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-087091 filed on May 19, 2020, which is hereby incorporated by reference herein in its entirety.

What is claimed is:

1. A measuring device comprising:
a first roller pair configured to feed a sheet;
a colorimetric unit provided downstream of the first roller pair with respect to a sheet feeding direction and configured to measure a color of an image on the sheet;
a second roller pair provided downstream of the colorimetric unit with respect to the sheet feeding direction and configured to be rotated at a peripheral speed that is greater than a peripheral speed of the first roller pair;
a third roller pair provided downstream of the second roller pair with respect to the sheet feeding direction and configured to feed the sheet;
a motor configured to drive the first roller pair and the second roller pair; and
a torque limiter configured to permit rotation of the second roller pair at a peripheral speed equal to the peripheral speed of the first roller pair in a state in which the sheet is nipped in both the first roller pair and the second roller pair,
wherein the third roller pair is driven at a first speed before a trailing end of the sheet with respect to the sheet feeding direction passes through the first roller pair and is driven at a second speed that is greater than the first speed after the trailing end of the sheet passes through the first roller pair,
wherein the first speed is set so as to be equal to the peripheral speed of the first roller pair; and
wherein the second speed is set so as to be equal to a peripheral speed of the second roller pair in a state in which a slip of the torque limiter is not caused.

2. A measuring device according to claim 1, further comprising:
a sheet detecting unit configured to detect passing of the sheet,
wherein a driving speed of the third roller pair is changed from the first speed to the second speed in accordance with a timing, when the trailing end of the sheet passes through the first roller pair, determined on the basis of a detection timing of the sheet detecting unit.

3. A measuring device according to claim 1, further comprising:
a sheet detecting unit configured to detect passing of the sheet,
wherein a driving speed of the third roller pair is changed from the first speed to the second speed at a timing when a predetermined delay time has elapsed from a timing, when the trailing end of the sheet passes through the first roller pair, determined on the basis of a detection timing of the sheet detecting unit.

4. A measuring device according to claim 1, further comprising a stacking portion on which the sheet discharged from the measuring device by the third roller pair is stacked.

5. A measuring device according to claim 1, further comprising:
a moving unit configured to move the colorimetric unit in a main scan direction along axial directions of the first roller pair and the second roller pair,
wherein measurement by the colorimetric unit is carried out while moving the colorimetric unit in the main scan direction by the moving unit in a state in which feeding of the sheet by the first roller pair and the second roller pair is stopped and in which tension depending on a torque value of the torque limiter acts on the sheet.

6. A measuring device according to claim 1, wherein the measuring device is configured to transmit rotation of the motor to the first roller pair and the second roller pair and configured so that a ratio of an angular speed of the second roller pair to an angular speed of an output shaft of the motor is greater than a ratio of an angular speed of the first roller pair to the angular speed of the output shaft of the motor.

7. An image reading apparatus comprising:
a first roller pair configured to feed a sheet;
a reading unit provided downstream of the first roller pair with respect to a sheet feeding direction and configured to read image information of the sheet;
a second roller pair provided downstream of the reading unit with respect to the sheet feeding direction and configured to be rotated at a peripheral speed that is greater than a peripheral speed of the first roller pair;
a motor configured to drive the first roller pair and the second roller pair; and
a torque limiter configured to permit rotation of the second roller pair at a peripheral speed equal to the peripheral speed of the first roller pair in a state in which the sheet is nipped in both the first roller pair and the second roller pair.

8. An image forming system comprising:
an image forming unit configured to form an image on a sheet;
a first roller pair configured to feed a sheet;
a colorimetric unit provided downstream of the second roller pair with respect to a sheet feeding direction and configured to measure a color of an image on the sheet;
a second roller pair provided downstream of the colorimetric unit with respect to the sheet feeding direction and configured to be rotated at a peripheral speed that is greater than a peripheral speed of the first roller pair;
a third roller pair provided downstream of the second roller pair with respect to the sheet feeding direction and configured to feed the sheet;
a motor configured to drive the first roller pair and the second roller pair; and
a torque limiter configured to permit rotation of the first roller pair at a peripheral speed equal to the peripheral speed of the first roller pair in a state in which the sheet is nipped in both the first roller pair and the second roller pair,
wherein the third roller pair is driven at a first speed before a trailing end of the sheet with respect to the sheet feeding direction passes through the first roller pair and is driven at a second speed that is greater than the first speed after the trailing end of the sheet passes through the first roller pair,
wherein the first speed is set so as to be equal to the peripheral speed of the first roller pair; and
wherein the second speed is set so as to be equal to a peripheral speed of the second roller pair in a state in which a slip of the torque limiter is not caused.

9. An image forming system according to claim 8, further comprising:
a sheet detecting unit configured to detect passing of the sheet,
wherein a driving speed of the third roller pair is changed from the first speed to the second speed in accordance with a timing, when the trailing end of the sheet passes through the first roller pair, determined on the basis of a detection timing of the sheet detecting unit.

10. An image forming system according to claim 8, further comprising:
a sheet detecting unit configured to detect passing of the sheet,
wherein a driving speed of the third roller pair is changed from the first speed to the second speed at a timing when a predetermined delay time has elapsed from a timing, when the trailing end of the sheet passes through the first roller pair, determined on the basis of a detection timing of the sheet detecting unit.

11. An image forming system according to claim 8, further comprising a stacking portion on which the sheet discharged from the measuring device by the third roller pair is stacked.

12. An image forming system according to claim 8, further comprising:
   a moving unit configured to move the colorimetric unit in a main scan direction along axial directions of the first roller pair and the second roller pair,
   wherein measurement by the colorimetric unit is carried out while moving the colorimetric unit in the main scan direction by the moving unit in a state in which feeding of the sheet by the first roller pair and the second roller pair is stopped and in which tension depending on a torque value of the torque limiter acts on the sheet.

13. An image forming system according to claim 8, wherein the measuring device is configured to transmit rotation of the motor to the first roller pair and the second roller pair and configured so that a ratio of an angular speed of the second roller pair to an angular speed of an output shaft of the motor is greater than a ratio of an angular speed of the first roller pair to the angular speed of the output shaft of the motor.

14. A measuring device comprising:
   a first roller pair configured to feed a sheet;
   a colorimetric unit provided downstream of the first roller pair with respect to a sheet feeding direction and configured to measure a color of an image on the sheet;
   a second roller pair provided downstream of the colorimetric unit with respect to the sheet feeding direction and configured to be rotated at a peripheral speed that is greater than a peripheral speed of the first roller pair;
   a motor configured to drive the first roller pair and the second roller pair;
   a torque limiter through which a driving force of the motor is transmitted to the second roller pair; and
   a moving unit configured to move the colorimetric unit in a main scan direction along axial directions of the first roller pair and the second roller pair,
   wherein the colorimetric unit measures the color of the image on the sheet while moving in the main scan direction in a state in which feeding of the sheet by the first roller pair and the second roller pair is stopped.

15. A measuring device according to claim 14, further comprising:
   a third roller pair provided downstream of the second roller pair with respect to the sheet feeding direction and configured to feed the sheet,
   wherein the third roller pair is driven at a first speed before a trailing end of the sheet with respect to the sheet feeding direction passes through the first roller pair and is driven at a second speed higher than the first speed after the trailing end of the sheet passes through the first roller pair.

16. A measuring device according to claim 15, further comprising a stacking portion on which the sheet discharged from the measuring device by the third roller pair is stacked.

17. A measuring device according to claim 14, wherein the measuring device is configured to transmit rotation of the motor to the first roller pair and the second roller pair and configured so that a ratio of an angular speed of the second roller pair to an angular speed of an output shaft of the motor is greater than a ratio of an angular speed of the first roller pair to the angular speed of the output shaft of the motor.

18. A measuring device according to claim 14, wherein the motor is configured to repeat an operation in which the sheet is fed by a predetermined distance and the feeding of the sheet is stopped, and
   wherein the colorimetric unit measures the color of the image on the sheet while the motor stops the feeding of the sheet.

* * * * *